Dec. 27, 1938.  H. H. B. LUND  2,141,478
APPARATUS FOR THE GERMINATION OF SEEDS AND THE GROWTH OF SEEDLINGS
Filed July 6, 1937  2 Sheets-Sheet 1
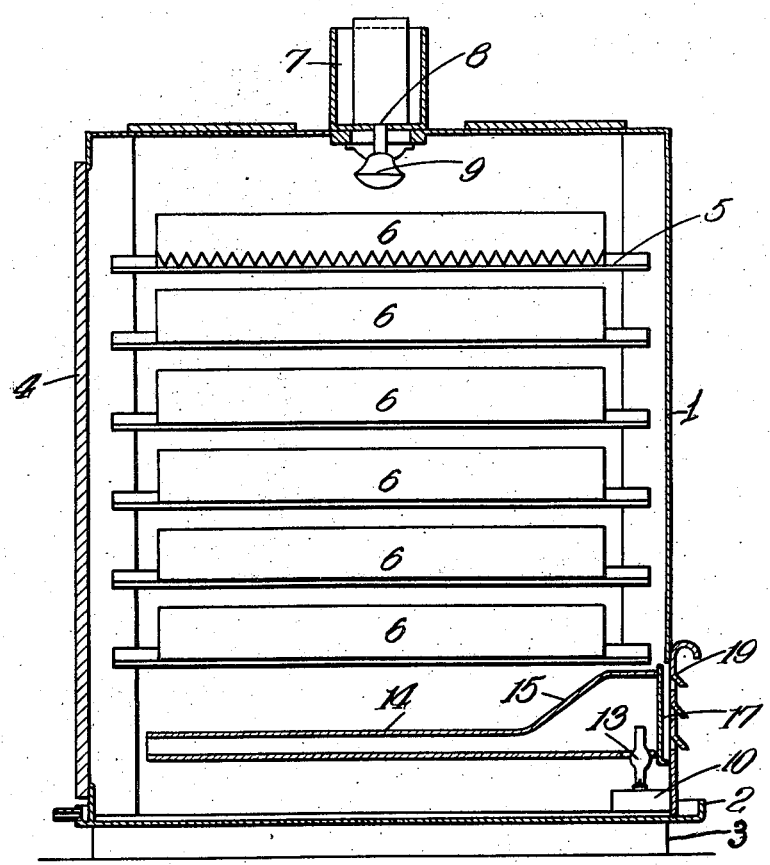
INVENTOR:
HENRY HILTON BLAIR LUND
BY Haseltine, Lake & Co.
ATTORNEYS Dec. 27, 1938. H. H. B. LUND 2,141,478
APPARATUS FOR THE GERMINATION OF SEEDS AND THE GROWTH OF SEEDLINGS
Filed July 6, 1937 2 Sheets-Sheet 2
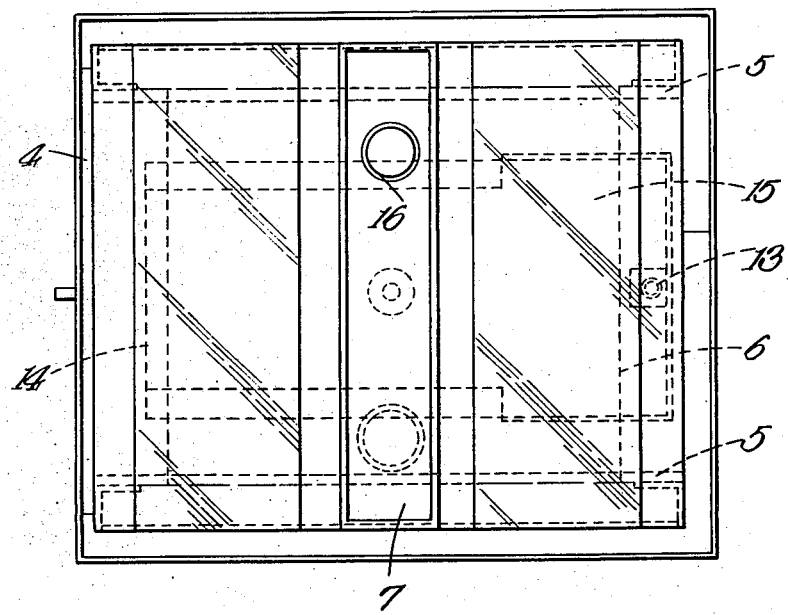
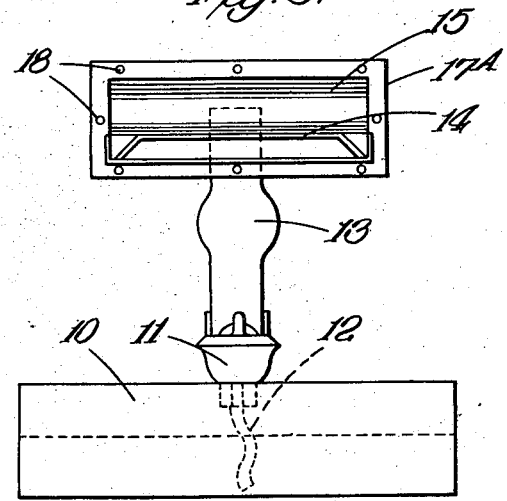
INVENTOR:
HENRY HILTON BLAIR LUND
BY Haseltine Lake & Co.
ATTORNEYS Patented Dec. 27, 1938

2,141,478

UNITED STATES PATENT OFFICE 2,141,478

APPARATUS FOR THE GERMINATION OF SEEDS AND THE GROWTH OF SEEDLINGS

Henry Hilton Blair Lund, Welwyn Garden City, England

Application July 6, 1937, Serial No. 152,268
In Great Britain July 6, 1936

2 Claims. (Cl. 47—16)

This invention relates to apparatus for the germination of seeds and the growth of seedlings for human food, fodder and the like, and is concerned with soil-less cultivation cabinets of the type consisting of a closed cabinet having means for heating the interior of the cabinet to a desired temperature and having internally arranged trays for the reception of seeds or seedlings, there being means for supplying a fertilizer liquid to the trays. Various arrangements have been proposed for heating the interior of the cabinet, but it is found that such known heating means suffer deterioration due to the conditions maintained within the cabinet. In a cabinet constructed in accordance with the specification of my co-pending patent application Serial No. 132,055, fertilizer liquid is sprinkled upon the trays and percolates therethrough finally collecting at the lower part of the cabinet. The falling fertilizer liquid has a deleterious effect upon known type heating means arranged within the cabinet.

It is the chief object of the invention to overcome the difficulties as regards deterioration of the heating means arranged within the cabinet due to the conditions therein, and at the same time to afford an interior heating means which will effectively maintain the desired temperature within the cabinet without producing undesirable fumes within the cabinet.

According to the invention a heating means in, or for, a cultivation cabinet of the type referred to consists of a heater and baffle, the latter being formed with a passage for heated gases and being arranged to lie substantially horizontal, said heater being adapted to supply heated gases directly to the passage and to lie beneath said baffle so as to be protected thereby from falling liquid. The baffle is preferably formed as an elongated chamber open at one end and adapted at the other end to receive the chimney, chimneys or the like of an oil heater, the baffle over the major part of its length having a broad but shallow section.

In order that the said invention may be clearly understood and readily carried into effect the same will now be described more fully with reference to the accompanying drawings, in which:—

Figure 1 is a sectional side view through a cabinet having the heating means in accordance with the invention, Figure 2 is a plan view of the cabinet, shown in Figure 1, and Figure 3 is a view of the heating means as seen from the front of the cabinet, this view being on a larger scale.

The cabinet shown in Figure 1 has a main sheet metal body 1 carried in a tray 2 supported upon joists 3. At the front side of the cabinet there is a door 4 through which access to the interior of the cabinet is afforded. Angle-section runners 5 are secured within the cabinet, each pair of runners 5 serving to support a single tray 6 for the reception of seeds to be sprouted. When all the trays 6 are in position within the cabinet, they form a single vertical group. On the upper side of the body 1 a trough 7 is arranged, such trough having an outlet 8 connecting with a sprinkler rose 9. The trough 7 contains a ball float and ball valve control mechanism which is preferably formed in the way set out in my British Patent 468,992. The ball control valve (not shown) would then be arranged to close the outflow aperture 8 until the liquid contained in the trough 7 has reached a predetermined level. With the aid of the ball float, as soon as the liquid in the trough 7 reaches a predetermined high level, the ball control valve leaves the outflow aperture 8, and a flow of the liquid from the trough 7 through the sprinkler rose 9 then follows. The sprinkler system and tray arrangement illustrated in the drawings, forms the subject of my copending patent application Serial No. 132,055. Preferably also the trays are formed in the way set out in the specification of my co-pending patent application Serial No. 152,266.

The heating means for maintaining the temperature of the interior of the cabinet at the desired degree for germination of the seeds, and growth of the seedlings in the trays, consists of an oil heating device and a baffle. The oil heater comprises a reservoir tank 10 in which is secured a burner 11 having a wick 12. The burner 11 supports a chimney 13 in known manner. The baffle consists of a hollow sheet metal member 14 which towards the rear end of the cabinet, has a portion of greater depth 15. Apart from the portion 15, as may be seen from Figure 3, the baffle 14 is formed of slight depth, but is of considerable width, the side margins being bevelled. The portion 15 of the baffle forms a chamber in which the upper end of the chimney 13 projects, the heated gases from the chimney first entering the chamber 15, and thereafter flowing downwardly through the remaining forwardly extending flattened portion of the baffle 14. The heated air finally escapes through the end of the baffle 14 and passes up along the front of the cabinet.

An escape for heated gases is formed by a flue 16 which passes through the trough 7, so that liquid in such trough will be slightly preheated. The rear side of the chamber 15 is closed by a heat insulating sheet 17, made of asbestos for example, to which the walls of the chamber 15 may be secured as by rivets 18, passing through a flange 17a formed on the end of the walls of the chamber 15. The asbestos sheet 17 is supported rigidly upon the rear wall of the body 1 of the cabinet, such support being afforded by brackets which hold the sheet 17 in spaced relation on the rear wall of the body 1. The rear wall is formed with an aperture through which access to the oil burner may be had, such aperture being normally closed by a louvre shutter 19, which is received in guideways (not shown) formed on the rear wall of the cabinet. The louvres in the shutter 19 allow fresh air to enter the cabinet and to flow up past the asbestos sheet 17 into the portion of the cabinet containing the trays 6.

When the oil burner is operating, as indicated above, heated air passes into the chamber 15. In addition the products of combustion will also enter the chamber 15. As will be observed from Figure 1 the asbestos sheet 17 does not extend to the bottom of the cabinet, so that air for the oil burner enters the lower louvres of the shutter 19 and, therefore, there will be a plentiful supply of air for the oil burner. The heated gases flowing from the chamber 15 through the forward part of the baffle 14, will cause the baffle as a whole to be heated, and by radiation the interior of the cabinet will receive heat from the baffle. By reason of the fact that the heated gases must pass through the length of the baffle before escaping into the cabinet, impurities in the heated gases will be in the main deposited within, or condensed upon the interior of, the baffle so that the gases escaping from the end thereof will substantially consist only of air. This is an important point, since the fumes of the oil lamp if no baffle were present might seriously affect the growth and germination of the seeds in the seed trays.

It will be understood that the heating means described above are particularly applicable to the heating of the type of cultivation cabinet referred to, where it is important that an effective heat transfer should be made, whilst the heating means should be protected from the action of falling liquid and at the same time give a substantially fumeless heating of the cabinet.

The baffle 14 adequately protects the oil burner against the action of falling liquid whilst itself acting as a heat exchanging element. By retention of the impurities of the heated gases in the baffle the purity of the air within the cabinet is assured.

The heating means described, is advantageous in its application to a cabinet having a single vertical group of trays and a sprinkler system in accordance with the specification of my co-pending patent application Serial No. 132,055, because in practice where a cabinet is constructed having a single group of trays, it is important that an inexpensive heating means should be at disposal, since otherwise the reduction in cost by forming a cabinet with only one group of trays, might not be sufficiently great to warrant economic production of small type cabinets.

What I claim and desire to secure by Letters Patent of the United States is:—

1. In a soil-less cultivation cabinet a heating means comprising a hollow baffle dimensioned so as to lie within, and extend across, the lower portion of the interior of the cabinet, a closure member at the rear open end of the baffle, the front end thereof opening into the cabinet, an inlet at the rear end of the said baffle, an oil heater arranged to supply hot gases to the inlet of said baffle, the wall of the cabinet adjacent the rear end of the baffle being formed with an aperture to allow access to the oil heater, and a shutter which normally closes said aperture and through which air may pass.

2. In a soil-less cultivation cabinet, heating means comprising a baffle dimensioned so as to lie within, and extend across, the lower portion of the cabinet, said baffle being hollow and over the major part of its length having a cross-section such that the width thereof is several times the depth thereof, a closure member formed from heat insulating material and spaced from the adjacent wall of the cabinet said closure member serving to close the otherwise open rear end of the baffle, the front end of the latter opening into the cabinet, an inlet for hot gases located at the rear end of the baffle, an oil heater for the supply of said hot gases, said oil heater being located adjacent the rear end of the baffle, and the said wall of the cabinet adjacent to the closure member being formed with an opening, and a shutter serving normally to close said opening and also permitting the passage of air therethrough.

HENRY HILTON BLAIR LUND.